US00RE41119E

(19) United States
(12) Reissued Patent
Åkesson et al.

(10) Patent Number: US RE41,119 E
(45) Date of Reissued Patent: Feb. 16, 2010

(54) BOREHOLE OPENER

(76) Inventors: Leif Åkesson, Folkvozdveien 132, 4300 Sandnes (NO); Antonio Carosielli, rue des Bleuets 124, 7160 Chapelle-Lez-Herlaimont (BE)

(21) Appl. No.: 10/409,581

(22) Filed: Apr. 8, 2003

Related U.S. Patent Documents

Reissue of:
(64) Patent No.: 6,360,831
Issued: Mar. 26, 2002
Appl. No.: 09/521,408
Filed: Mar. 8, 2000

(30) Foreign Application Priority Data

Mar. 9, 1999 (BE) ..... 09900163

(51) Int. Cl.
*E21B 10/62* (2006.01)
*E21B 10/00* (2006.01)
*E21B 10/26* (2006.01)
*E21B 10/32* (2006.01)

(52) U.S. Cl. ..... 175/269; 175/271
(58) Field of Classification Search ..... 175/267, 175/291, 320, 269, 279, 271, 273, 274
See application file for complete search history.

(56) References Cited

U.S. PATENT DOCUMENTS 2,438,673 A 3/1948 McMahan
3,556,233 A 1/1971 Gilreath et al.
3,974,886 A 8/1976 Blake, Jr.
4,186,810 A 2/1980 Allan
4,503,919 A 3/1985 Suied
4,821,817 A 4/1989 Cendre et al.
5,255,741 A 10/1993 Alexander
5,271,472 A 12/1993 Leturno

FOREIGN PATENT DOCUMENTS

GB 2128657 A 5/1984

*Primary Examiner*—Shane Bomar
(74) *Attorney, Agent, or Firm*—Browning Bushman P.C.

(57) ABSTRACT

Borehole opener, particularly for enlarging this hole underneath a casing in the field of oil prospecting, comprising a body (2) of longitudinal axis (3), a duct (4) for drilling fluid, formed longitudinally in the body (2), and at least two hole-opening arms (5) which have an active part (7) equipped with cutting means (8), which are distributed symmetrically in the body (2) about the longitudinal axis (3), and which are arranged therein in such a way that they can be moved between a position of rest (9) in the body (2) and an active position (10) partially out of the body (2); in this hole opener in order to move it from the position of rest (9) to the active position (10), each arm (5) has a face (12), internal to the body (2), designed to be subjected directly, in the same way as an active face of a piston, to the pressure of the drilling fluid flowing through the body (2).

10 Claims, 3 Drawing Sheets

BOREHOLE OPENER

Matter enclosed in heavy brackets [ ] appears in the original patent but forms no part of this reissue specification; matter printed in italics indicates the additions made by reissue.

*CROSS REFERENCE TO RELATED APPLICATIONS*

*Applicants claim priority under 35 U.S.C. § 119 based upon Belgium Application No. 09900163 filed 9 Mar. 1999.*

BACKGROUND OF THE INVENTION

The present invention relates to a borehole opener, particularly for enlarging this hole underneath a casing in the field of oil prospecting, the hole opener comprising a body of longitudinal axis, a duct for drilling fluid, formed longitudinally in the body, and at least two hole-opening arms which have an active part equipped with cutting means, which are distributed symmetrically in the body about the longitudinal axis, and which are arranged therein in such a way that they can be moved between a position of rest in the body and an active position partially out of the body.

BACKGROUND OF THE PRIOR ART

Prospecting for oil of natural gas, for example, requires the probing of increasingly deep depths. What is more, it is desirable to drill with small diameters so as to reduce the drilling time and tooling costs. The counterpart to this is an increase in pressure drop for the drilling fluid flowing between the wall of the hole and the drilling string and therefore a reduction in the ability to remove particles of formation as a result of the lack of circulation of the drilling fluid at a sufficiently high flow rate. As a result, control over the equivalent density of the sludge formed by the drilling fluid and these particles of formation can rapidly be lost. This equivalent density gives rise to a pressure which may be desirable at certain formations, in order to somewhat shore up the bored wall, and is therefore usually monitored to make sure that this pressure does not exceed a value above which at least this bored wall is excessively contaminated with the sludge and/or is excessively damaged in terms of its texture and composition and/or may even be destroyed.

In order to avoid these problems with the bored wall, it is also necessary to be able easily to adjust this equivalent density. This then entails improving the circulation of the sludge so as to encourage the removal of particles of formation which would build up in the hole and which would have an adverse influence on the equivalent density.

To achieve this it is known practice possibly to make use of a conventional hole opener, with moving arms, which can enlarge the diameter of the hole already bored to up to twice its original size. Hole openers known to date comprise mechanisms, of the hinge and pivot-pin type, which are rather delicate to be used at a high rate of advance and are too long to be placed between the drill bit and, in particular, an angled coupling well known to those skilled in the art and employed for directional drilling.

Drill bits with two offset longitudinal axes (bi-center bits) and pilot tools (pilot bits) associated with boring tools and comprising a hole-opening fin fixedly projecting from the rest of the bit are already known. These devices are able to open out the hole at the same time as boring it. However, because of their asymmetric structure, these devices have an imbalanced behavior and because of this produce vibrational forces which are detrimental to the mechanisms to which they are coupled and to the condition of the bored hole. What is more, because of this, these devices frequently cause unacceptable deviations in the bored holes.

SUMMARY OF THE INVENTION

The object of the present invention is to overcome the problems set out hereinabove and to propose a hole opener with moving arms which is compact and robust and the mechanism of which involves a very small number of moving parts, these advantageously having to be easy to remove and replace in the event of an incident occurring during operation. What is more, the hole opener of the invention is to have a small bulk in the lengthwise direction, so that it can readily be installed very near a drill bit, in a drill string, between the drill bit and the aforementioned angled coupling.

Underlying the invention, prior research was carried out into the amount of opening needed to solve the problem, explained hereinabove, of removing of sludge. Surprisingly, it was found that opening the hole out to a diameter approximately 10 to 20% greater, for example, than that of the casing or the nominal diameter of the associated drill bit, was sufficient to achieve this.

The problem of simplifying the mechanism was solved, according to the invention, by choosing that, inorder to move it from the position of rest into the active position, each hole-opening arm has a face, internal to the body, designed to be subjected directly, in the same way as an active face of a piston, to the pressure of the drilling fluid flowing through the body.

According to one embodiment of the invention, each arm is kept in the position of rest in the body, prior to a hole-opening operation, by at least one pin designed to break when the pressure of the drilling fluid flowing through the body exceeds a predetermined value higher than a maximum usual boring value.

Operations of troubleshooting, removing and replacing any problematical parts are simplified by choosing to mount the arm in the body by means of an intermediate support which acts as a housing for the arm in the body and which is fixed to the latter. As a preference, the intermediate support, the arm, elastic means for returning the arm into the body and the pin constitute an assembly designed to be assembled in advance outside the body and then installed therein.

Other details and particular features of the invention will become apparent from the appended claims and from the description of the hole opener of the invention, which description is given hereinbelow by way of nonlimiting example with reference to the appended drawings.

DESCRIPTION OF THE PREFERRED EMBODIMENTS

Figure 1:
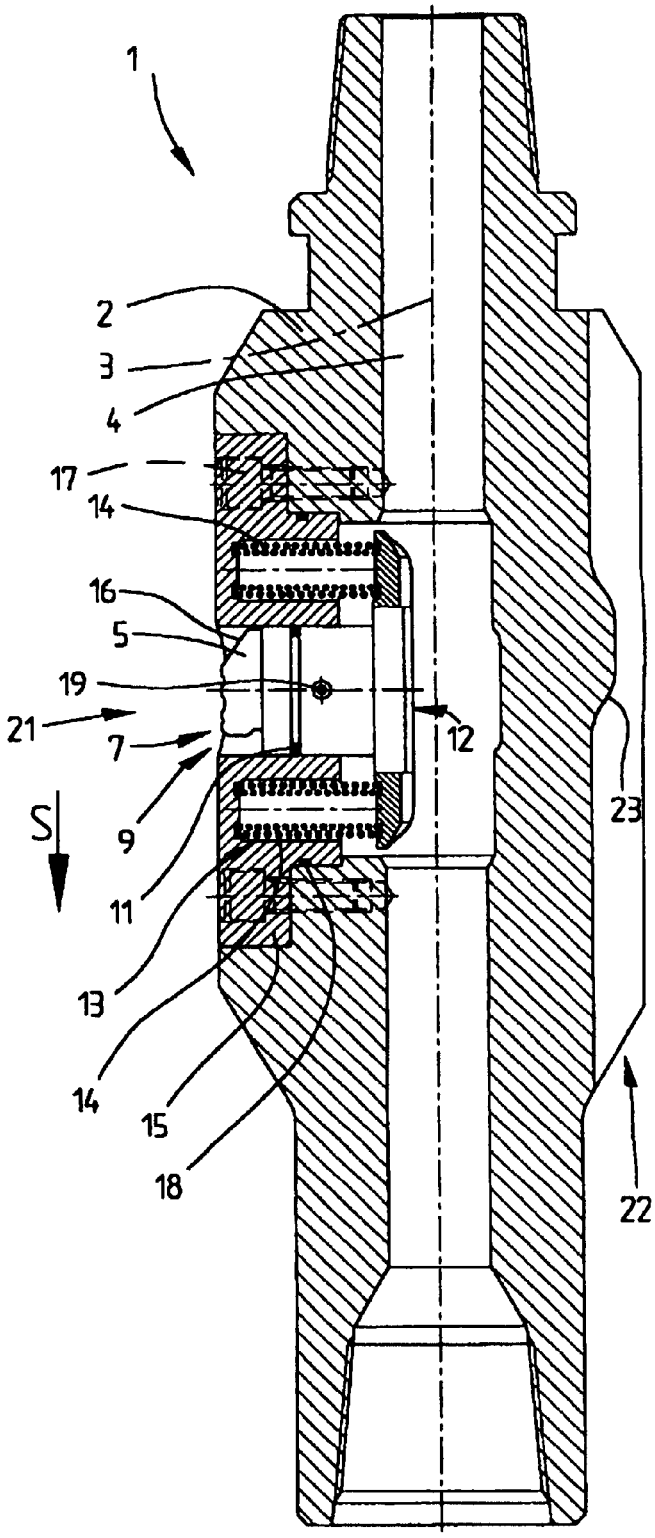
FIG. 1 shows, in axial section, a hole opener of the invention, an arm visible in the figure being in the position of rest.
Figure 2:
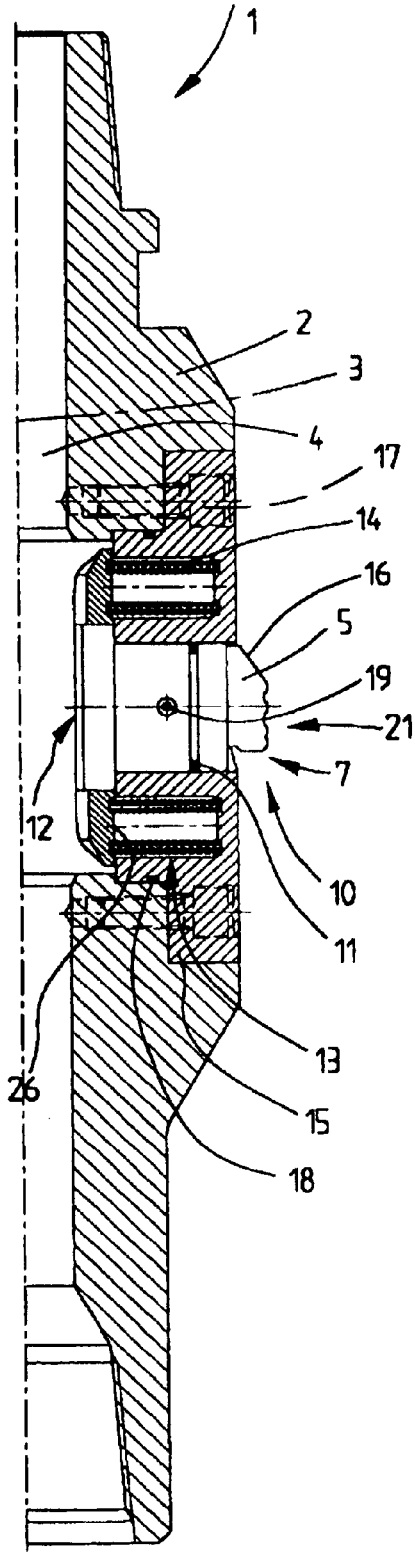
FIG. 2 shows a partial axial section in which the visible arm is in the active position.
Figure 3:
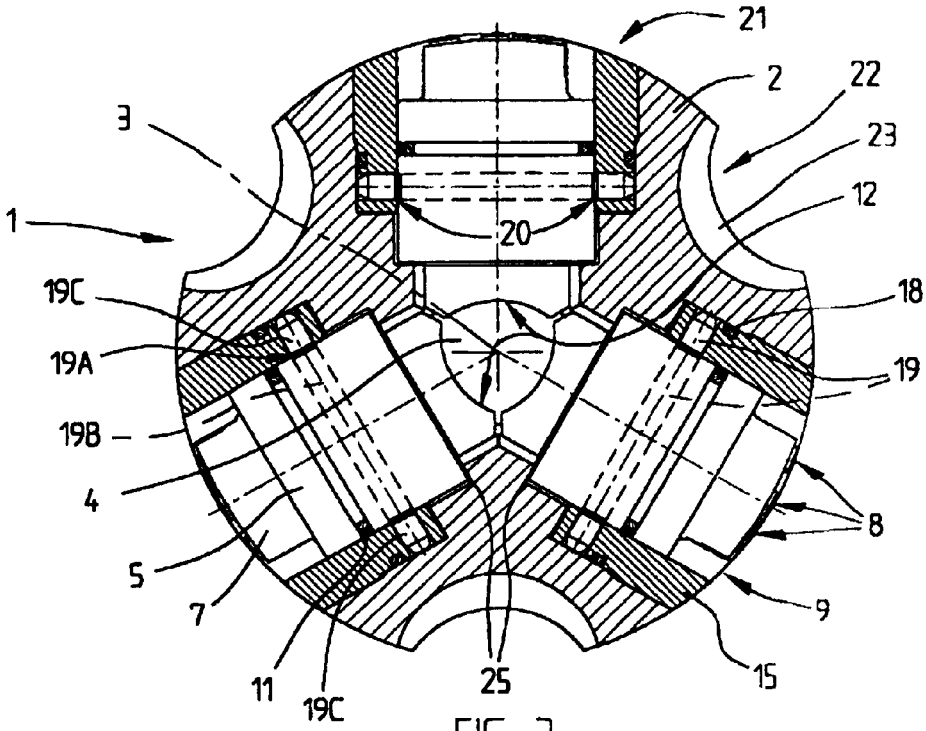
FIGS. 3 and 4 each show a cross section in which three hole-opening arms are depicted in the position of rest, and in the active position, respectively.
Figure 4:
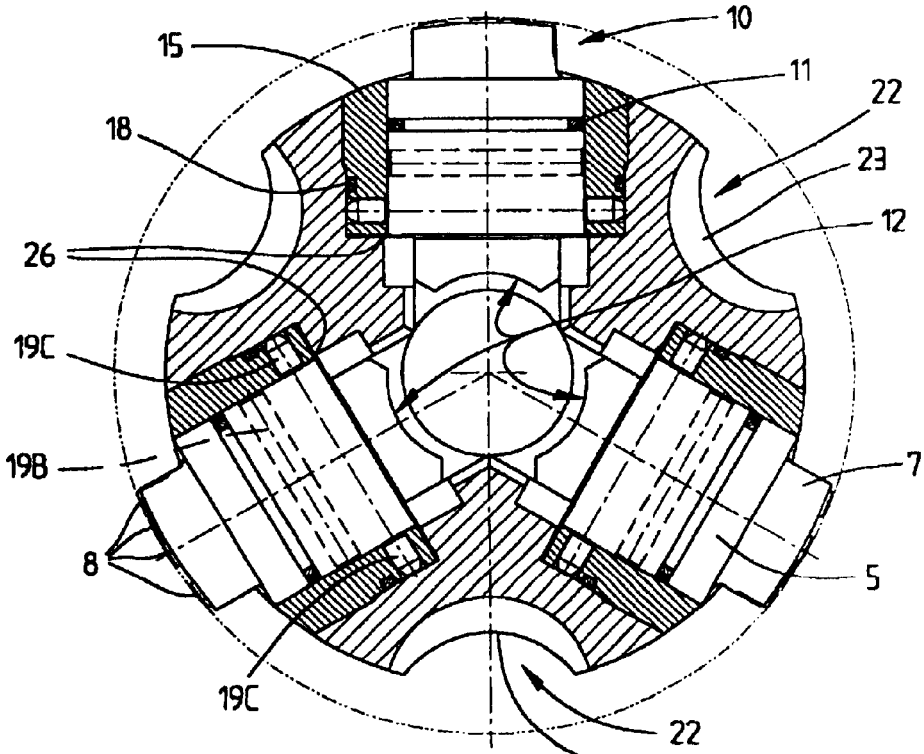

In the various figures, the same references denote similar or analogous elements The hole opener 1 of the invention, as depicted by way of example in FIGS. 1 to 4, comprises a body 2 of longitudinal axis 3, a duct 4 for drilling fluid, formed longitudinally in the body 2, and at least two hole-opening arms 5 which are distributed symmetrically in the body 2 about the longitudinal axis 3 to make sure that the operation of the hole opener 1 is approximately balanced. FIGS. 3 and 4 show that three arms 5 can easily be arranged in the body 2 with angles of 120° between two successive arms 5.

Figure 5:
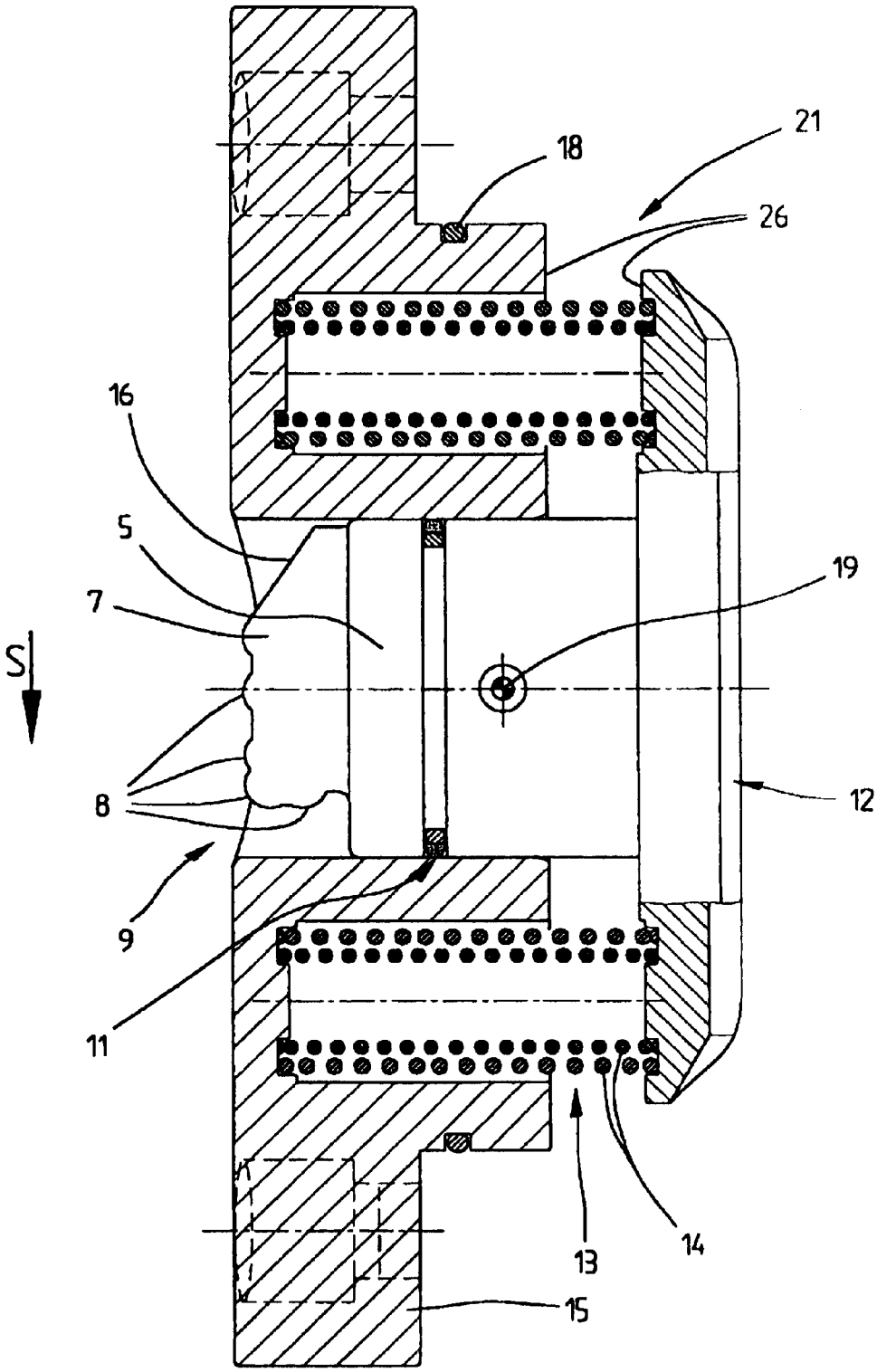
FIG. 5 shows, to a larger scale and in longitudinal section, an assembly comprising an arm and an intermediate support so that arms can be mounted and exchanged quickly.

The arms 5 each have an active part 7 equipped with cutting means 8 (FIGS. 3 to 5) which are known and explained hereinbelow. The arms 5 are arranged in the body 2 so that they can be moved between a position of rest 9 in this body 2 and an active position 10 partially out of this same body 2.

According to the invention, each arm 5 comprises, for moving it from the position of rest 9 into the active position 10, a face 12 internal to the body 2 and designed to be subjected directly, in the same way as an active face of a piston, to the pressure of the drilling fluid flowing through the body 2. Through this arrangement, it is possible to avoid having intermediate mechanical parts between the fluid which is to actuate the arm 5 and this arm, and the problems known to those skilled in the art which may ensue.

The internal face 12 of the arm 5 should be understood as meaning any face/surface in contact, at any moment in the drilling and/or hole-opening operation, with the pressurized fluid flowing through the duct 4. It is obvious that some of these faces/surfaces subjected to the same pressure will compensate for each other but, overall, there remains enough positive area that, for example with a positive pressure differential of the order of 2 MPa (about 300 psi) between the pressure of the fluid in the duct 4 and that of the fluid outside the body 2 in the region of the arm or arms 5, a thrust force of the order of 2000 kg can be obtained, in order to deploy the arm 5 from the body 2.

As a preference, the arm 5 is mounted in such a way that it can slide parallel to itself in the body 2, so as to move from the position of rest 9 into the active position 10 and vice versa. The choice of a movement of this kind is one of the more favorable types of movement, for operation in the manner of a piston. A movement of pivoting about an axis (not depicted) perpendicular to the longitudinal axis 3 and to the direction of the travel of the arm 5, and arranged somewhat away from the arm 5 is, however, also possible, but would require special matching of significantly higher cost than the matching of the previous embodiment in order to implement it.

In order to provide the aforementioned piston function, sealing means 11 are provided at places which are known to those skilled in the art.

To move it from the active position 10 into the position of rest 9 when the pressure in the duct 4 decreases, each arm 5 advantageously engages elastic return means 13, for example compression coil springs 14 as depicted in the drawings. This arrangement allows the hole opener 1 to be withdrawn from the borehole without difficulty.

The arm 5 may, in the active position 10 out of the body 2, have a posterior face 16 (with reference to a direction of advance for opening out the hole) which is at an angle, designed, for example if the springs 14 should be deficient, to help the arm 5 back into the body 2 when the hole opener 1 is being withdrawn from the borehole.

The arm 5 can be mounted in the body 2 by means of an intermediate support 15 which acts as a housing for the arm 5 in the body 2 and which is fixed to the latter, for example by screws 17. Sealing means 18 may then be provided between the body 2 and said intermediate support 15.

As a preference, prior to a hole-opening operation, each arm 5 is kept in the position of rest 9 in the body 2 by at least one pin 19 designed to break when the pressure of the drilling fluid flowing through the body 2 exceeds a predetermined value higher than a maximum usual boring value.

For this purpose, the pin 19 may have a region 19A of calibrated weakness, at one or more points of transition 20 where the pin 19 passes, as the case may be, either from the body 2 or from the intermediate support 15 into the arm 5. It is obvious that, unlike what has been depicted in FIGS. 3 and 4, the pin 19 does not necessarily have to emerge from both sides of the arms 5.

This pin 19 may fix the arm 5 merely to the intermediate support 15 (FIGS. 3 and 4).

FIG. 4 shows the pin 19 broken into one part 19B in the arm and two parts 19C in the intermediate support 15.

The intermediate support 15, the arms 5, the aforementioned elastic means 14 and the pin 19 may therefore constitute an assembly 21 (FIG. 5) designed to be assembled beforehand outside the body 2 and then installed therein. This then makes the hole opener 1 not only easier to assemble, but also easier to maintain or repair in the event of damage, etc.

On its outer face, between two successive arms 5, the body 2 may have a longitudinal passage 22 for returning drilling fluid to the surface, and a boss 23 arranged in this passage 22 so as to divert and/or deflect the drilling fluid which is rising back up toward the surface onto that part of the wall of the hole on which the arms 5 are acting. The passage 22 and the boss 23 are produced in such a way as not to form too great a restriction to the passage of the returning fluid.

It must be understood that the present invention is not in any way restricted to the embodiments described hereinabove and that many modifications may be made thereto without departing from the scope of the claims given hereinbelow.

In the preferred embodiment of the hole opener 1 of the invention, the travel of an arm 5 between the position of rest 9 and the active position 10 is limited in both directions of travel by stops. In the position of rest 9, the arm 5 is usually completely retracted into the body 2 and is held therein by reciprocal stop surface 25 (FIG. 3) or, as appropriate, by the pin 19. In the active position 10, the arm 5, retained by reciprocal stop surface 26 (FIGS. 2 and 4), sweeps through an area, the largest diameter of which is equal to between 1.05 and 1.3 times, preferably 1.2 times the nominal diameter of a drill bit associated with the hole opener 1 for a combined drilling and hole-opening operation.

The cutting means 8 on the arms 5 are arranged by the person skilled in the art in such a way as, for example, to obtain cutting efficiency similar to that of the cutting means of the associated drill bit.

The reciprocal stop surfaces 26 may be arranged on exchangeable or adjustable elements so as to allow a user of the hole opener 1 to choose the extent to which the arms 5 can deploy out of the body 2 during service.

Key to the figures

1 hole opener
2 body
3 longitudinal axis
4 duct
5 hole-opening arms
7 active part
8 cutting means
9 position of rest
10 active position
11 sealing means
12 internal face
13 elastic return means
14 coil springs
15 intermediate support
16 posterior face
17 screws
18 sealing means
19 pin
19A weakened region(s)
19B part of the pin
19C part of the pin
20 transition point
21 assembly
22 longitudinal passage
23 boss
25 reciprocal stop surfaces
26 reciprocal stop surfaces
S direction of advance of a hole-opening/boring process

What is claimed is:

1. A hole opener, particularly for enlarging the borehole underneath a casing, comprising:

a body of longitudinal axis, a duct for drilling fluid, formed longitudinally in the body, at least two hole-opening arms, each arm having an active part equipped with cutting means distributed symmetrically in the body about the longitudinal axis and arranged in such body in a way that said arms can be moved between a position of rest in the body and an active position partially out of the body, wherein, in order to move said arms from the position of rest into the active position, each arm has a face, internal to the body, designed to be subjected directly to the pressure of the drilling fluid flowing through the body, and wherein, to move the arms from the active position into the position of rest, the hole-opener comprises an elastically effective return for returning the arms to the position of rest.

2. The hole opener as defined in claim 1, wherein at least one of said arms is mounted in such a way that said at least one arm can slide parallel to itself in the body so as to move from the position of rest into the active position.

3. A hole opener, particularly for enlarging the borehole underneath a casing, comprising:

a body of longitudinal axis, a duct for drilling fluid, formed longitudinally in the body, at least two hole-opening arms, each arm having an active part equipped with cutting means distributed symmetrically in the body about the longitudinal axis and arranged in such body in a way that said arms can be moved between a position of rest in the body and an active position partially out of the body, wherein, in order to move said arms from the position of rest into the active position, each arm has a face, internal to the body, designed to be subjected directly to the pressure of the drilling fluid flowing through the body, wherein each arm is temporarily kept in a position of rest by at least one pin designed to break when the pressure of the drilling fluid flowing through the duct exceeds a predetermined value.

4. A hole opener as defined in claim 3, wherein at least one of said arms is mounted in the body by means of an intermediate support which acts as a housing for said at least one arm in the body and which is fixed to said at least one arm.

5. A hole opener as defined in claim 4, wherein the aforementioned pin fixes said at least one arm to said intermediate support.

6. A hole opener as claimed in claim 5, wherein the intermediate support, the at least one arm, the aforementioned elastically effective return and the pin constitute an assembly designed to be assembled in advance outside the body and then installed in the body.

7. A hole opener as defined in claim 3, wherein at least one of said arms is mounted in the body by means of an intermediate support which acts as a housing for said at least one arm in the body and which is fixed to said at least one arm.

8. A hole opener, particularly for enlarging the borehole underneath a casing, comprising:

a body of longitudinal axis, a duct for drilling fluid, formed longitudinally in the body, at least two hole-opening arms, each arm having an active part equipped with cutting means distributed symmetrically in the body about the longitudinal axis and arranged in such body in a way that said arms can be moved between a position of rest in the body and an active position partially out of the body, wherein, in order to move said arms from the position of rest into the active position, each arm has a face, internal to the body, designed to be subjected directly to the pressure of the drilling fluid flowing through the body, wherein each arm is temporarily kept in a position of rest by at least one pin designed to break when the pressure of the drilling fluid flowing through the duct exceeds a predetermined value wherein the pin comprises a region of calibrated weakness.

9. A hole opener, particularly for enlarging the borehole underneath a casing, comprising:

a body of longitudinal axis, a duct for drilling fluid, formed longitudinally in the body, at least two hole-opening arms, each arm having an active part equipped with cutting means distributed symmetrically in the body about the longitudinal axis and arranged in such body in a way that said arms can be moved between a position of rest in the body and an active position partially out of the body, wherein, in order to move said arms from the position of rest into the active position, each arm has a face, internal to the body, designed to be subjected directly to the pressure of the drilling fluid flowing through the body, wherein on an outer face, between two successive arms, the body has a longitudinal passage for returning drilling fluid, and a boss arranged in this passage so as to define the drilling fluid onto that part of the wall of the borehole on which the arms are acting.

10. A hole opener as defined in claim 3, wherein the travel of at least one arm between the position of the rest and the active position is limited by stops, and also by the pin so that in the position of rest, said at least one arm is fully retracted into the body and so that in the active position, said at least one arm sweeps through an area, the largest diameter of which area is equal to between 1.05 and 1.3 times the nominal diameter of a drill bit associated with the hole opener for a combined drilling and hole-opening operation.

* * * * *